(12) United States Patent
Gorny (10) Patent No.: US 10,732,106 B2
(45) Date of Patent: Aug. 4, 2020

(54) TWO DETECTOR GAS DETECTION SYSTEM

(71) Applicant: Honeywell International Inc., Morris Plains, NJ (US)

(72) Inventor: Richard Gorny, Des Plaines, IL (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/240,500

(22) Filed: Jan. 4, 2019

(65) Prior Publication Data
US 2019/0242817 A1     Aug. 8, 2019

Related U.S. Application Data

(60) Provisional application No. 62/625,837, filed on Feb. 2, 2018.

(51) Int. Cl.
| G01N 21/55 | (2014.01) |
| G01N 21/61 | (2006.01) |
| G01N 21/78 | (2006.01) |

(52) U.S. Cl.
CPC ............ *G01N 21/61* (2013.01); *G01N 21/55* (2013.01); *G01N 21/783* (2013.01)

(58) Field of Classification Search
CPC ...... G01N 21/61; G01N 21/55; G01N 21/274; G01N 2201/127; G01N 2201/0612; G01N 21/276; G01J 3/08; G01J 3/42
USPC .................................................. 356/432–440
See application file for complete search history.

(56) References Cited

U.S. PATENT DOCUMENTS

| 4,180,734 A * | 12/1979 | Gedeon | G01N 21/3504 250/345 |
| 4,701,010 A * | 10/1987 | Roberts | G02B 6/2817 385/31 |
| 5,532,813 A * | 7/1996 | Ohishi | G01S 7/4815 250/553 |
| 2007/0007449 A1* | 1/2007 | Hubner | G01N 21/3504 250/338.1 |
| 2011/0085174 A1* | 4/2011 | Rohacek | G01N 21/6408 356/496 |

(Continued)

FOREIGN PATENT DOCUMENTS

WO     2017139523 A1     8/2017

*Primary Examiner* — Hoa Q Pham
(74) *Attorney, Agent, or Firm* — Craige Thompson; Thompson Patent Law (57) ABSTRACT

Apparatus and associated methods relate to a gas detection apparatus including a main optical element configured to: (1) direct a first portion of light emitted from a light generating element (after the first portion of light has interacted with a target medium) to a primary detector via a second optical element, and (2) direct a second portion of light emitted from the light generating element to a reference detector via a third optical element. In various examples, the main optical element may be a reflector such as a mirror. The light generating element may, for example, be a red, green, and blue (RGB) light emitting diode(s) (LED(s)). The optical train may, for example, have a single/unitary molded transparent acrylic construction and internal reflective surfaces. A gas detection apparatus may standardize the optical path used by the light generating element and the primary/reference detectors, advantageously providing for reliable operation.

18 Claims, 5 Drawing Sheets

(56) References Cited

U.S. PATENT DOCUMENTS

2011/0299084 A1* 12/2011 Feitisch .................... G01J 3/28
356/433
2012/0202294 A1 8/2012 Jin
2016/0327533 A1 11/2016 Jin et al.

* cited by examiner

TWO DETECTOR GAS DETECTION SYSTEM

CROSS-REFERENCE TO RELATED APPLICATIONS

This application claims the benefit of U.S. Provisional Application Ser. No. 62/625,837, titled "Two Detector Gas Detection System," filed by Richard Gorny, on Feb. 2, 2018.

This application incorporates the entire contents of the foregoing application(s) herein by reference.

TECHNICAL FIELD

Various embodiments relate generally to gas detectors.

BACKGROUND

Optical systems include a variety of components for generating and manipulating light. For example, an optical system may have a light generating source such as an LED or laser. The optical system may include one or more lenses to focus and direct the generated light, and may include one or more mirrors to reflect the generated light. Light generating sources may produce visible light, infrared light, ultraviolet light, or other types/frequencies/wavelengths of light. Some light sources may emit light in a narrow frequency band, while other light sources may emit light with a wide frequency band (e.g., white light).

Gas detectors are devices that detect the presence of gases in an area. A gas detector may be used to detect a gas leak or other emissions, and may interface with a control system (e.g., industrial machinery/electronics) so a process can be automatically shut down when hazardous or leaking gas is detected. A gas detector may sound an alarm to operators in the area where a leak is occurring, which may give operators the opportunity to escape a hazardous situation. Gas detectors may be used to detect combustible, flammable, and/or toxic gases, and may be used to monitor oxygen depletion. Gas detectors may be portable or may be integrated with fixed industrial equipment.

SUMMARY

Apparatus and associated methods relate to a gas detection apparatus including a main optical element configured to: (1) direct a first portion of light emitted from a light generating element (after the first portion of light has interacted with a target medium) to a primary detector via a second optical element, and (2) direct a second portion of light emitted from the light generating element to a reference detector via a third optical element. In various examples, the main optical element may be a reflector such as a mirror. The light generating element may, for example, be a red, green, and blue (RGB) light emitting diode(s) (LED(s)). The optical train may, for example, have a single/unitary molded transparent acrylic construction and internal reflective surfaces. A gas detection apparatus may standardize the optical path used by the light generating element and the primary/reference detectors, advantageously providing for reliable operation.

Various embodiments may achieve one or more advantages. For example, a gas detection apparatus may advantageously function without through hole detectors needing to be bent or positioned to measure off-axis reflection. Some embodiments may include primary and reference detectors that may advantageously be used to reliably and accurately identify an ambient gas. The reference detector may, in some embodiments, advantageously ensure stability of emission from the light generating element. A lens may provide for a more focused and less dispersed light beam for the reference detector, which may advantageously increase the reliability and accuracy of the reference detector. An anti-reflective (AR) coating may advantageously mitigate stray light signatures from being detected at the primary and reference detectors. A pair of walls may advantageously mitigate stray light signatures from being detected at the primary and reference detectors. A (parabolic) mirror may provide for a more focused and less dispersed light beam for the primary detector, which may advantageously increase the reliability and accuracy of the primary detector. First and second curved reflective surfaces may provide for a more focused and less dispersed light beam for the respective primary and reference detectors, which may advantageously increase the reliability and accuracy of the primary and reference detectors. A waveguide may aid in guiding the light emitted from the light generating element to/from the target medium with low attenuation, thus advantageously mitigating weakening of light signals arriving at the primary and reference detectors. First and second curved reflective surfaces may provide a more focused and less dispersed light beam for respective primary and reference detectors, which may advantageously increase the reliability and accuracy of the primary and reference detectors.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1:
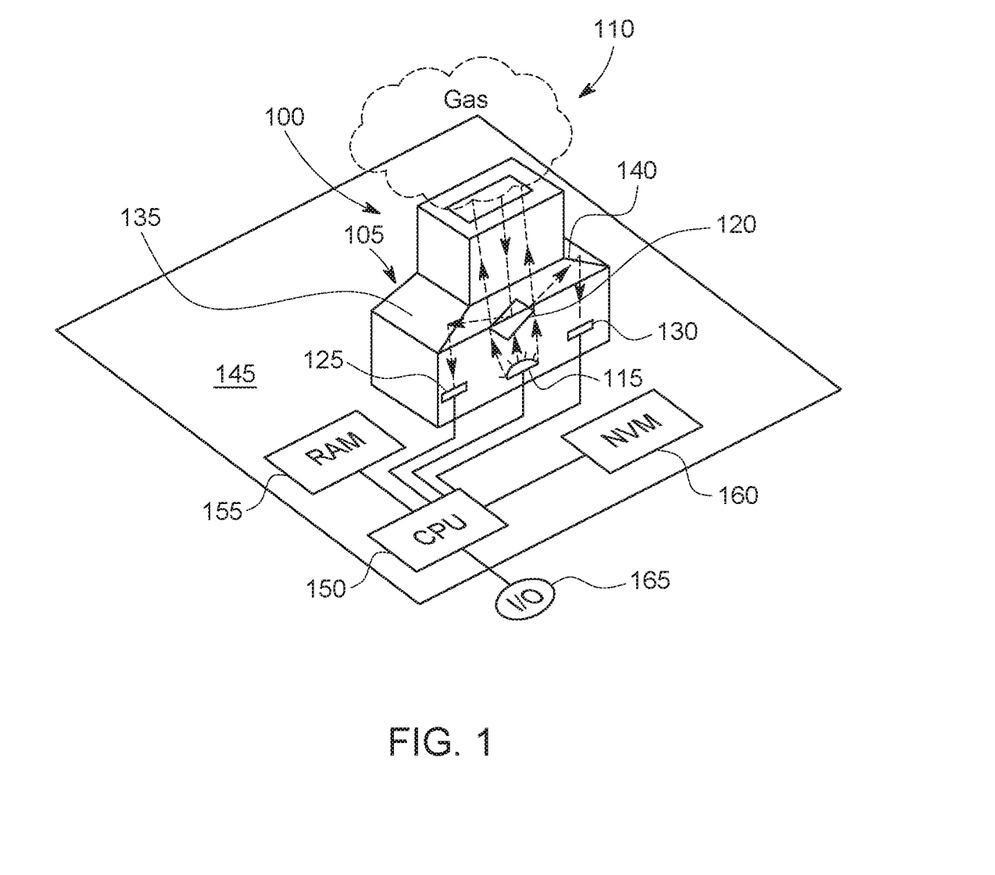
FIG. 1 depicts a perspective view of an exemplary gas detection apparatus coupled with a computing system.

FIG. 1 depicts a perspective view of an exemplary gas detection apparatus coupled with a computing system. The gas detection apparatus 100 includes an optical train 105. Located in the vicinity of the optical train 105 is a target medium 110 that is being measured/detected by the gas detection apparatus 100. Included with the gas detection apparatus 100 is a light generating element 115 (e.g., RGB LED(s)). Located above the light generating element 115 is a main optical element 120 (e.g., two-sided mirror). Included with the gas detection apparatus 100 is a primary (photo-)detector (PD) 125 and a reference (photo-)detector (RD) 130.

In operation, a first portion of light emitted from the light generating element passes through or around the main optical element, illuminating the target medium. After the first portion of light interacts with the target medium (possibly altering at least one characteristic of the first portion of light), the (altered) first portion of light is directed (e.g., reflected or reemitted) back to the main optical element. The main optical element directs (e.g., reflects) the (altered) first portion of light to a second optical element 135 (e.g., a first reflective surface of the optical train). The second optical element then directs (e.g., reflects and/or focuses) the (altered) first portion of light to the primary (photo-)detector. In response to receiving the (altered) first portion of light, the primary detector outputs a primary signal that is used to correctly identify a chemical that has interacted with the target medium (e.g., identify a toxic gas that has changed the color of a chemo-chromic material).

In operation, a second portion of light emitted from the light generating element reaches the main optical element. The second portion of light is directed (e.g., reflected) by the main optical element to a third optical element 140 (e.g., a second reflective surface of the optical train). The third optical element then directs (e.g., reflects and/or focuses) the second portion of light to a reference (photo-)detector. In response to receiving the second portion of light, the reference detector outputs a reference signal that may be used to verify proper calibration of the gas detection apparatus 100. Accordingly, the signals generated by the primary and reference (photo-)detectors may advantageously be used to reliably identify a chemical that has interacted with the target medium.

In this exemplary depiction, the gas detection system 100 is included with a printed circuit board (PCB) 145. The gas detection system 100 may, for example, be fixedly coupled on the PCB. Operably coupled to the gas detection system 100 is a central processing unit (CPU) 150, volatile memory (e.g., RAM) 155, and non-volatile memory (NVM) 160. In this exemplary embodiment, the CPU, volatile memory, and NVM are fixedly coupled on the PCB. The CPU is operably coupled to the light generating element, the primary detector, and the reference detector, such that the CPU is: (1) configured to control the light generating element, and (2) receive primary and reference signals from the primary and reference detectors, respectively. For example, the CPU may control a luminance level of the light generating element. In various embodiments, the CPU may control the frequencies of light emitted by the light generating element. For example, if the light generating element is an RGB LED, the CPU may command the RGB LED to emit red light, but not green or blue light.

The NVM may act as storage memory for the CPU. For example, the NVM may store data associated with the primary and reference signals generated by the primary and reference detectors, respectively. The NVM may contain program instructions that may be executed by the CPU. For example, the CPU may execute an algorithm (possibly stored in the NVM) that allows the CPU to correctly identify a specific chemical (e.g., toxic gas) based on the received primary and/or reference signals. The CPU may compare the received and primary and reference signals for gas detection purposes. In some examples, the reference signal may be used to ensure that light being emitted from the light generating element is constant, and that changes which may arise from, for example, temperature, shock, and degradation, are not improperly interpreted by the primary detector (e.g., as a false-positive or false-negative).

The CPU is operably coupled to an input/output module (I/O) 165. The I/O may transmit data from the CPU to another computing system. For example, the I/O may relay information from the CPU to a centralized database or monitoring/control system that is coupled to multiple distributed gas detection apparatuses 100. The I/O may receive data from another computing system and transmit the data to the CPU. For example, a central control system may send a command to the CPU (via the I/O) instructing the CPU to halt operations/computations due to a detected malfunction of the gas detection apparatus 100.

In some embodiments, the optical train may be an enclosure that encloses the main optical element. The optical train may, for example, be a molded, unitary construction, optical train. The optical train may facilitate measurement of reflectance in a gas detection system. In some examples, a gas detection system may include a light generating element, a primary detector, a reference detector, an optical feature (or reflector), and a detected media/medium. In operation, the main optical element (e.g., a reflector such as a mirror) may direct a light beam emitted from the light generating element, to the reference detector. The optical element may direct another light beam, which has interacted with the detected media/medium, to the measurement detector. The reference detector may advantageously ensure stability of emission from the optical element.

Figure 2:
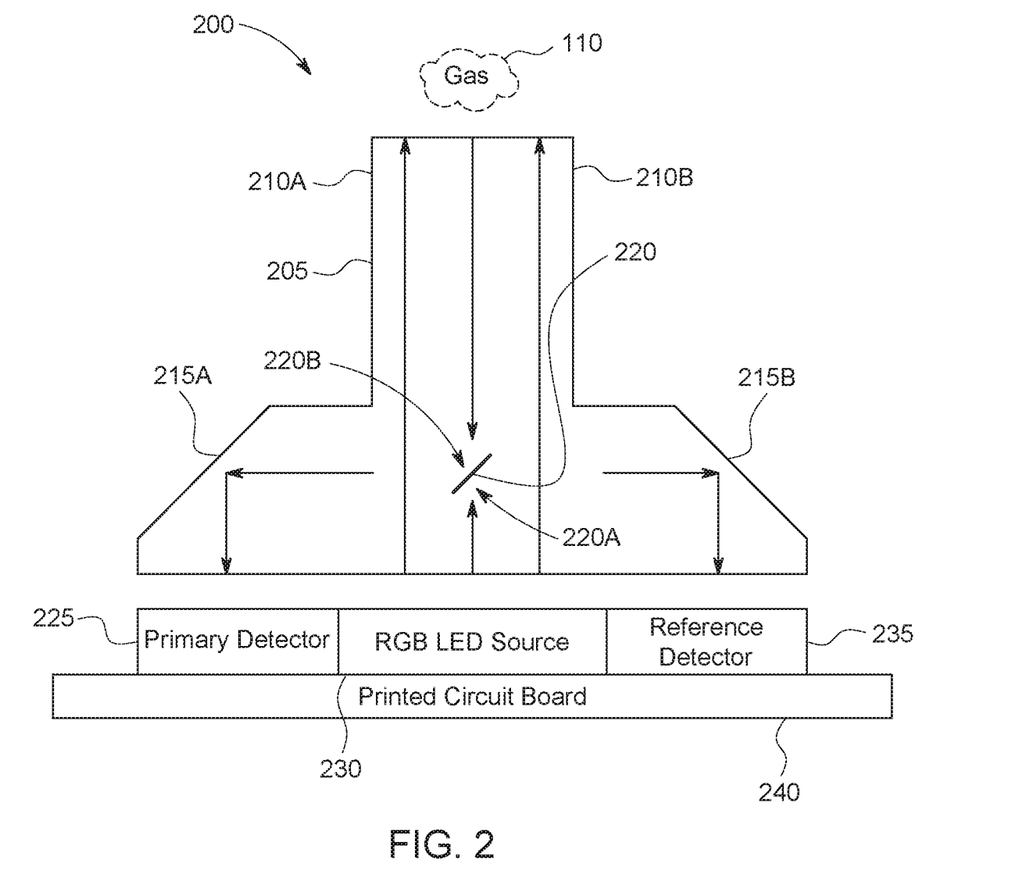
FIG. 2 depicts a cross-sectional view of an exemplary gas detection apparatus.

FIG. 2 depicts a cross-sectional view of an exemplary gas detection apparatus. A gas detection apparatus 200 includes an optical train 205. The optical train includes two vertically extending walls 210A, 210B and two reflective surfaces 215A, 215B that make respective 45-degree angles with respect to the two vertically extending walls. The two vertically extending walls may form an upper columnar structure of the optical train. In some embodiments, the vertically extending walls may form a single wall having, for example, a cylindrical shape. In some examples, the walls may include optical features such as, for example, facets or coatings, that may prevent stray light from improperly adding noise to the gas detection apparatus. Inside of the optical train is an optical element 220 (e.g., a beam splitter).

A mirror (one example of optical element 220) may be angled at a 45-degree angle with respect to the vertically extending walls and a bottom surface of the optical train, such that the mirror deflects vertically travelling light in horizontal directions. Located below the optical train are a primary detector 225, a light generating element 230, and a reference detector 235. The primary detector, light generating element, and reference detector are located on a top surface of a PCB 240. A gas detection apparatus 200 with the depicted construction may advantageously function without through hole detectors needing to be bent or positioned to measure off-axis reflection. For example, there may be assembly tolerances for optical components with leads, where the leads may be inserted in through holes for soldering. Inserting these leads through holes for soldering may result in undesired impositional and angular errors. Accordingly, the gas detection apparatus 200 may be constructed without such through hole detectors and avoid such impositional and angular errors associated with the through hole detectors. Instead, for example, a surface mount detector may be used as the primary and/or reference detectors, which may advantageously be more reliable for surface mounting versus through hole detectors.

When the light generating element is turned on, the light emitting from the light generating element will travel upwards toward the optical element and the top of the optical train. Some emitted light from the light generating element is directed by the optical element toward the right reflective surface, which then directs the light to the reference detector. Some emitted light from the light generating element travels towards a "media to be measured" (e.g., a material that may change its spectral contribution in response to reaction with a specific gas). When the emitted light reaches the media to be measured, it interacts with the media to be measured. Some of the emitted light is scattered, reflected, and/or reemitted back from the media to be measured toward the optical element. The optical element directs this scatted or reflected light towards the left reflective surface, which directs the scattered or reflected light towards a primary detector.

In some examples, the gas detection apparatus 200 may be referred to as a "Source-Reference-Measurement Optic Train." The optical train may have a single-piece, molded, transparent acrylic construction (or similar material incorporating internal reflective surfaces). Light emitted by the light generating element may be conducted to the media to be measured. A first surface 220A of an optical element may be used as a reflector to transfer a portion of the light to a reference detector, which may be used to ensure stability of the light generating element. Light reflected, scattered, and/or reemitted from the media to be measured may strike a second (e.g., opposite) surface 220B of the optical element, and may be reflected to the measurement detector. Accordingly, the optical train may facilitate the transmission of light between the media to be measured, the light generating element, the reference detector, and the measurement (e.g., primary) detector.

In some embodiments, an integral lens (one example of optical element 220) to collect and focus light may be employed in an optical path of the light generating element. The integral lens may, for example, be used instead of a mirror. In some examples, the main optical element may be a beam splitter. The operating principles of the beam splitter may be based on a surface geometry, coatings, and/or grating of components. In some examples, the beam splitter may constitute (multiple) surfaces of the (acrylic) optical train.

Figure 3:
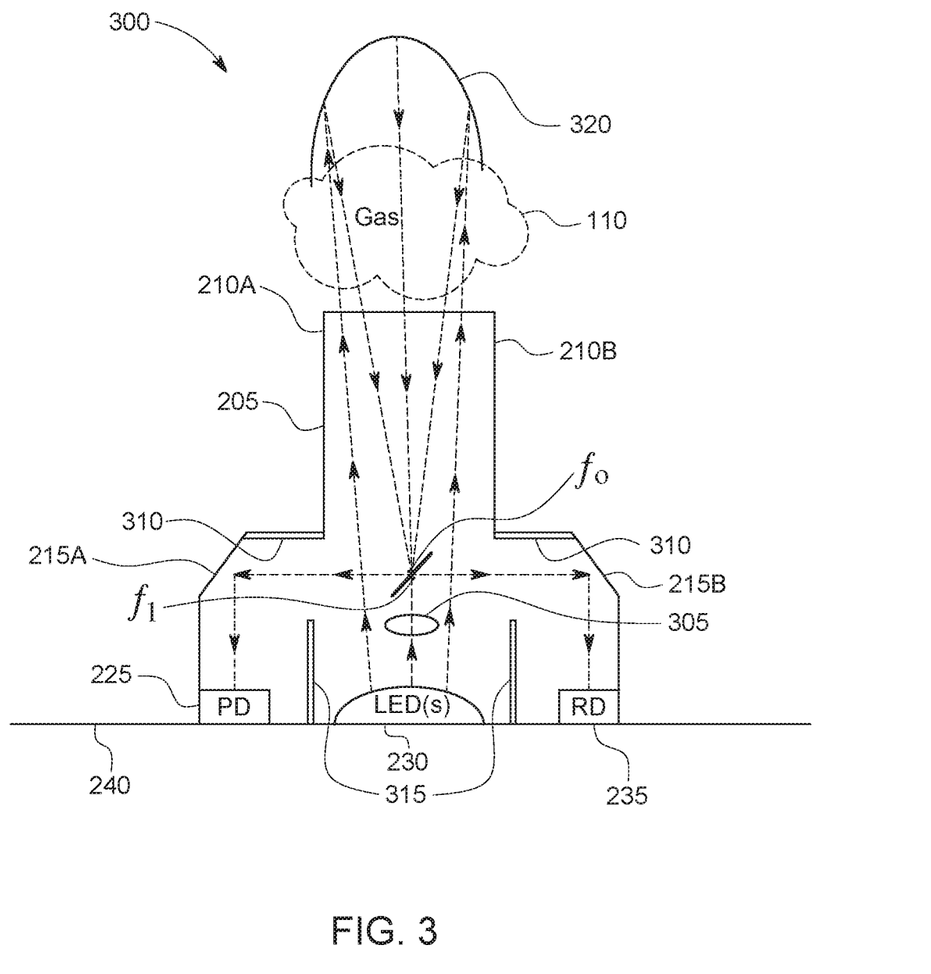
FIG. 3 depicts a cross-sectional view of an exemplary gas detection apparatus including a parabolic mirror, anti-reflective coating, and optical lens.

FIG. 3 depicts a cross-sectional view of an exemplary gas detection apparatus including a parabolic mirror, anti-reflective coating, and optical lens. A gas detection apparatus 300 includes (e.g., similar to gas detection apparatuses 100 and 200) an optical train (with vertical walls and first and second reflective surfaces), a light generating element (e.g., LED(s)), an optical element, a primary detector, and a reference detector. The gas detection apparatus 300 includes a lens 305 located between the light generating element and the optical element. The lens focuses light emitted from the light generating element towards a lens focal point ($f_1$). The lens focal point may be proximate to, on, or overlapping with, the optical element, such that a concentrated beam of light arrives at the optical element, is deflected toward the second reflective surface, and is again deflected toward the reference detector. In this sense, the lens may provide for a more focused and less dispersed light beam for the reference detector, which may advantageously increase the reliability and accuracy of the reference detector.

The gas detection apparatus includes an anti-reflective (AR) coating 310 (e.g., magnesium fluoride) on inner surfaces of the optical train that are located between the vertical walls and the reflective surfaces of the optical train. The AR coating may advantageously mitigate stray light signatures from being detected at the primary and reference detectors. Located on opposite sides of the light generating element are a pair of walls. The pair of walls 315 may be at least partly formed of an opaque material, such that the walls block light rays emitted from the light generating element. The pair of walls, in some embodiments, may be acrylic and/or integrally formed with the optical train. Accordingly, the pair of walls (like the AR coating) may advantageously mitigate stray light signatures from being detected at the primary and reference detectors. In some embodiments, AR coatings may be present on other parts or surfaces of the optical train.

Located on an opposite side of the optical element relative to the light generating element is a target medium 110. In this exemplary depiction, disposed adjacent to the target medium is a parabolic mirror 320 with a chemo-chromic coating. The parabolic mirror is positioned to interact with and reflect light emitted by the light generating element. The parabolic mirror has a focal point ($f_0$) that may be proximate to, on, or overlapping with, the optical element, such that a concentrated beam of light (after interacting with the chemo-chromic coating of the parabolic mirror) arrives at the optical element, is deflected toward the first reflective surface, and is again deflected toward the primary detector. In this sense, the parabolic mirror may provide for a more focused and less dispersed light beam for the primary detector, which may advantageously increase the reliability and accuracy of the primary detector.

Figure 4:
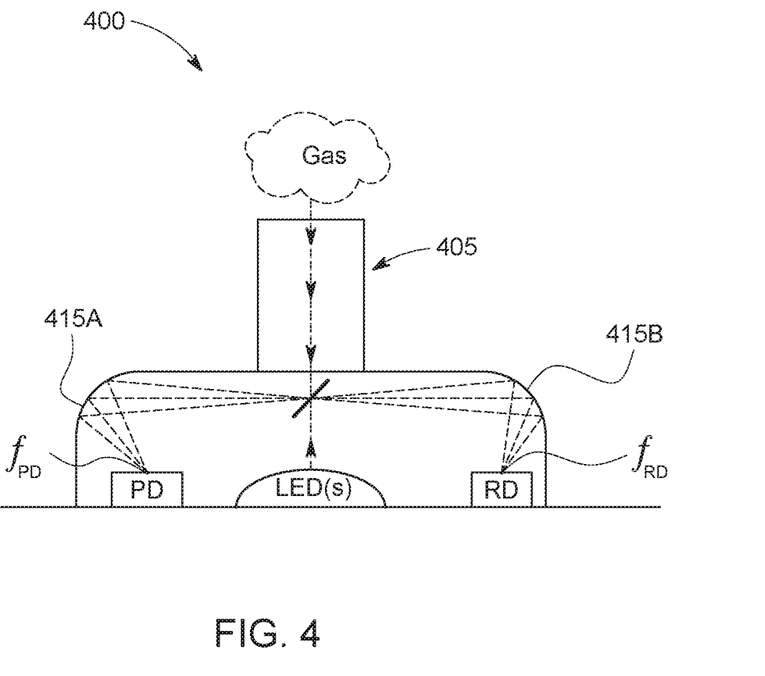
FIG. 4 depicts a cross-sectional view of an exemplary gas detection apparatus having an optical train that includes a waveguide and a pair of curved reflective surfaces.

FIG. 4 depicts a cross-sectional view of an exemplary gas detection apparatus having an optical train that includes a waveguide and a pair of curved reflective surfaces. A gas detection apparatus 400 includes (e.g., similar to gas detection apparatuses 100, 200, 300) an optical train (with vertical walls and first and second reflective surfaces), a light generating element (e.g., LED(s)), an optical element, a primary detector, and a reference detector. In this exemplary depiction, the first and second reflective surfaces 415A, 415B are curved to focus the light directed by the optical element toward respective primary and reference detectors. For example, the first and second reflective surfaces may have parabolic shapes, each with their own respective focal points (e.g., $f_{PD}$, $f_{RD}$).

When the light generating element is turned on, the light emitting from the light generating element will travel upwards toward the optical element and the top of the optical train. Some emitted light from the light generating element is directed by the optical element toward the second curved reflective surface, which then focuses and directs the light to $f_{RD}$ at the reference detector. Some emitted light from the light generating source travels towards a target medium (e.g., a fluid medium such as toxic gas). When the emitted light reaches the target medium, it interacts with the target medium. Some of the emitted light is scattered, reflected, and/or reemitted back from the target medium toward the optical element. The optical element directs this scatted or reflected light towards the left reflective surface, which focuses and directs the scattered, reflected, and/or reemitted light to $f_{PD}$ at a primary detector. In this sense, the first and second curved reflective surfaces may provide for a more focused and less dispersed light beam for the respective primary and reference detectors, which may advantageously increase the reliability and accuracy of the primary and reference detectors.

Located at a top section of the optical train is a waveguide 405. As the light emitted from the light generating element travels to/from the target medium, the emitted light, without assistance of the waveguide, may decrease in amplitude. The waveguide may aid in guiding the light emitted from the light generating element to/from the target medium with low attenuation. Accordingly, the waveguide may advantageously mitigate weakening of light signals arriving at the primary and reference detectors.

In some embodiments, the waveguide is contained within, or integrally formed with, the optical train. The waveguide may be, for example, a slab, (optical) fiber, or channel waveguide. The waveguide may, for example, have a cutoff frequency below the frequency of light emitted by the light generating element.

Figure 5:
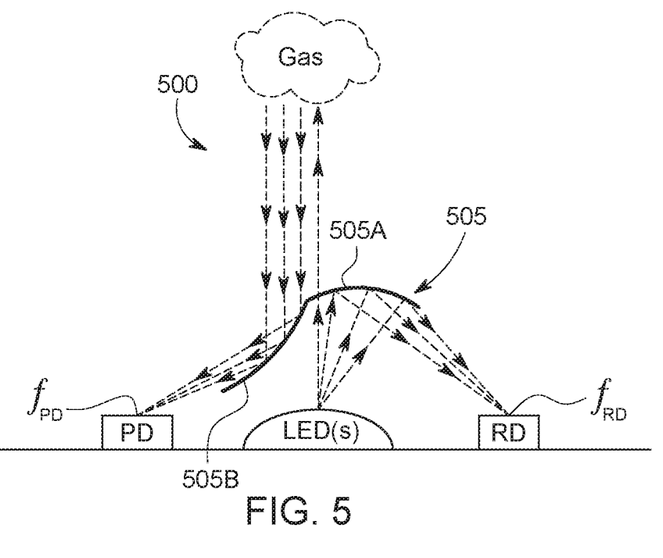
FIG. 5 depicts a cross-sectional view of an exemplary gas detection apparatus having an optical element that includes two partially reflective half parabolic mirrors.

FIG. 5 depicts a cross-sectional view of an exemplary gas detection apparatus having an optical element that includes two partially reflective half parabolic mirrors. A gas detection apparatus 500 includes (e.g., similar to gas detection apparatuses 100, 200, 300, 400) a light generating element (e.g., LED(s)), an optical element, a primary detector, and a reference detector. In this exemplary depiction, the optical element 505 includes two (e.g., a first and second) partially reflective/transparent half parabolic mirrors 505A, 505B. A first half parabolic mirror 505B has a focal point $f_{PD}$ at the primary detector. A second half parabolic mirror 505A has a focal point $f_{RD}$ at the reference detector.

When the light generating element is turned on, the light emitting from the light generating element will travel upwards toward the optical element. Some emitted light from the light generating element is directed by the optical element (e.g., the second half parabolic mirror) to $f_{RD}$ at the reference detector. Some emitted light from the light generating source travels towards a target medium (e.g., a fluid medium such as toxic gas) through the partially reflective/transparent half parabolic mirrors. When the emitted light reaches the target medium, it interacts with the target medium. Some of the emitted light is scattered, reflected, and/or reemitted back from the target medium toward the optical element. The optical element (e.g., the first half parabolic mirror) directs this scatted, reflected, and/or reemitted light to $f_{PD}$ at the primary detector. In this sense, the first and second curved reflective surfaces may provide for a more focused and less dispersed light beam for the respective primary and reference detectors, which may advantageously increase the reliability and accuracy of the primary and reference detectors.

In some examples, the optical element may include semi-silvered mirror(s). The semi-silvered mirror(s) may cause a portion of the light emitted by the light generating element to be reflected by the half parabolic mirrors, and may cause another portion of the light emitted by the light generating element to pass through the half parabolic mirrors (e.g., towards the target medium). In various examples, the optical element may be mounted above the light generating element (e.g., via an optical mount).

Although various embodiments have been described with reference to the Figures, other embodiments are possible. For example, a gas detection system may be scaled larger or smaller. A gas detection system may, in some embodiments, be used for measurement systems including a light source and reference/measurement detectors. In some embodiments, component placement tolerances of printed circuit board mount optical components and the mechanical assemblies they attach may require precise alignment or have significant operational tolerances associated with them. A gas detection apparatus disclosed herein may standardize the optical path used by light generating element (e.g., LED source), reference detector, and primary detector, advantageously providing for repeatable performance over a wide spectrum of tolerances.

In some examples, a target medium may include paper tape that produces color metric stains in response to exposure to a target gas. For example, the target medium may be a chemo-chromic material that has a unique chemistry that reacts with a specific target gas (e.g., carbon monoxide). The target medium may change color in response to the presence of a specific gas, such that the target medium displays a color stain. In some examples, the target medium may change its reflective properties (e.g., the percentage of light that is reflected by the target medium) in response to reaction with a specific gas. In various examples, the target medium may change its spectral contribution (e.g., the frequencies of light reflected/absorbed/(re-)emitted) in response to reaction with a specific gas. In some embodiments, the target medium may be a gas reactive media, which may, for example, be a fluid substance.

In various examples, lenses may be referred to as "optical features." In some embodiments, mirrors may be surfaces that fully or partially reflect light. An optical element may be an optically transmissive material such as, for example, an acrylic material with integral features to manage light. In various embodiments, an optical element may be integrally formed with the optical train. The optical element may, for example, include two prisms that interface with one another. The optical element may, for example, be partially or totally reflective. In some examples, the optical element may be (a) total internal reflective mirror(s). In various examples, the optical element may be molded into or with the optical train.

Some examples of a gas detection apparatus may include a light generating element. A gas detection apparatus may include an optical train adapted to provide for an optical pathway for light generated by the light generating element to travel to and from a target medium. The optical train may include a first reflective surface and second reflective surface. A gas detection apparatus may include a primary detector optically coupled with the light generating element. A gas detection apparatus may include a reference detector optically coupled with the light generating element. A gas detection apparatus may include an optical element located within the optical train. The optical element may be adapted to deflect a first light stream generated by the light generating element, after the first light stream has interacted with a target medium, to the first reflective surface, such that the first reflective surface deflects the first light stream to the primary detector. The optical element may be adapted to deflect a second light stream light generated by the light generating element to the second reflective surface, such that the second reflective surface deflects the second light stream to the reference detector.

In some examples, the optical train may be a unitary construction molded acrylic optical train. The optical element may, for example, be a two-sided mirror. In various embodiments, the light generating element, the primary detector, and the reference detector may all be located on a printed circuit board (PCB). Some embodiments may include a processor operably coupled to the light generating element, the primary detector, and the reference detector. A data store may, for example, be operatively coupled to the processor and may store instructions that, when executed by the processor, cause the processor to perform operations to identify the target medium. The operations may include, for example, activating the light generating element. The operations may include, for example, receiving a primary signal from the primary detector indicative of a characteristic of the first light stream. The operations may include, for example, receiving a reference signal from the reference detector indicative of a characteristic of the first light stream. The operations may include, for example, determining the identity of the target medium based on the received primary signal.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments may be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from a source to a receiver over a dedicated physical link (e.g., fiber optic link, infrared link, ultrasonic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, FireWire, ATA/IDE, RS-232, RS-422, RS-485, 802.11 a/b/g/n, Wi-Fi, WiFi-Direct, Li-Fi, BlueTooth, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In various embodiments, a computer system may include non-transitory memory. The memory may be connected to the one or more processors may be configured for encoding data and computer readable instructions, including processor executable program instructions. The data and computer readable instructions may be accessible to the one or more processors. The processor executable program instructions, when executed by the one or more processors, may cause the one or more processors to perform various operations.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated and within the scope of the following claims.

What is claimed is:
1. A gas detection apparatus comprising:
a light generating element;
an optical train configured to provide an optical pathway for light generated by the light generating element to travel to and from a target medium, the optical train comprising a first reflective surface and a second reflective surface,
wherein the optical train comprises a unitary construction optical train such that the first and second reflective surfaces are integrally and unitarily formed with the optical train, wherein the optical train further comprises at least one vertically extending wall, and wherein the first and second reflective surfaces are oriented at 45° angles with respect to the at least one vertically extending wall;

a primary detector;

a reference detector; and, an optical element disposed within the optical train, the optical element configured to:

deflect a first light stream generated by the light generating element, after the first light stream has interacted with the target medium, to the first reflective surface, such that the first reflective surface deflects the first light stream to the primary detector, and, deflect a second light stream generated by the light generating element to the second reflective surface, such that the second reflective surface deflects the second light stream to the reference detector.

2. The gas detection apparatus of claim 1, wherein the optical element is comprised in the optical train such that the optical element is integrally and unitarily formed with the optical train.

3. The gas detection apparatus of claim 1, wherein the optical element comprises a two-sided mirror.

4. The gas detection apparatus of claim 1, wherein the optical element comprises a beam-splitter.

5. The gas detection apparatus of claim 1, further comprising an anti-reflective (AR) coating on at least one surface of the optical train and disposed to mitigate stray light signatures from being detected at the primary and reference detectors.

6. The gas detection apparatus of claim 1, further comprising at least one wall disposed between the light generating element and at least one of the primary detector and the reference detector to mitigate stray light signatures from being detected at the primary and reference detectors.

7. The gas detection apparatus of claim 1, wherein the optical train further comprises a waveguide to facilitate guiding light emitted from the light generating element to and from the target medium.

8. The gas detection apparatus of claim 1, wherein:

the first reflective surface comprises a first curved reflective surface configured to concentrate the first light stream at the primary detector, and, the second reflective surface comprises a second curved reflective surface configured to concentrate the second light stream at the reference detector.

9. A gas detection apparatus comprising:

a light generating element;

an optical train configured to provide an optical pathway for light generated by the light generating element to travel to and from a target medium, the optical train comprising a first reflective surface and a second reflective surface, wherein the optical train further comprises at least one vertically extending wall, and wherein the first and second reflective surfaces are oriented at 45° angles with respect to the at least one vertically extending wall;

a primary detector;

a reference detector; and, an optical element disposed within the optical train, the optical element configured to:

deflect a first light stream generated by the light generating element, after the first light stream has interacted with the target medium, to the first reflective surface, such that the first reflective surface deflects the first light stream to the primary detector, and, deflect a second light stream generated by the light generating element to the second reflective surface, such that the second reflective surface deflects the second light stream to the reference detector.

10. The gas detection apparatus of claim 9, wherein the optical element comprises a two-sided mirror that is partially transparent and partially reflective such that the first light stream is configured to at least partially pass through the optical element.

11. The gas detection apparatus of claim 9, wherein the light generating element, the primary detector, and the reference detector are all disposed on a printed circuit board (PCB).

12. The gas detection apparatus of claim 9, further comprising:

a processor operably coupled to the light generating element, the primary detector, and the reference detector; and, a data store operatively coupled to the processor and storing instructions that, when executed by the processor, cause the processor to perform operations to identify the target medium, the operations comprising:

activate the light generating element;

receive a primary signal from the primary detector indicative of a characteristic of the first light stream;

receive a reference signal from the reference detector indicative of a characteristic of the second light stream; and determine an identity of the target medium based on the received primary signal.

13. The gas detection apparatus of claim 9, further comprising an anti-reflective (AR) coating on at least one surface of the optical train and disposed to mitigate stray light signatures from being detected at the primary and reference detectors.

14. The gas detection apparatus of claim 9, further comprising at least one wall disposed between the light generating element and at least one of the primary detector and the reference detector to mitigate stray light signatures from being detected at the primary and reference detectors.

15. The gas detection apparatus of claim 9, wherein:

the first reflective surface comprises a first curved reflective surface configured to concentrate the first light stream at the primary detector, and, the second reflective surface comprises a second curved reflective surface configured to concentrate the second light stream at the reference detector.

16. A gas detection apparatus comprising:

a light generating element;

a lens to focus light generated by the light generating element;

an optical train configured to provide an optical pathway for light generated by the light generating element to travel to and from a target medium, the optical train comprising a first reflective surface and a second reflective surface, wherein the optical train further comprises at least one vertically extending wall, and wherein the first and second reflective surfaces are oriented at 45° angles with respect to the at least one vertically extending wall;

a primary detector;

a reference detector; and, an optical element disposed within the optical train, the optical element configured to:

deflect a first light stream generated by the light generating element, after the first light stream has interacted with the target medium, to the first reflective surface, such that the first reflective surface deflects the first light stream to the primary detector, and, deflect a second light stream generated by the light generating element to the second reflective surface, such that the second reflective surface deflects the second light stream to the reference detector.

17. The gas detection apparatus of claim 16, further comprising an anti-reflective (AR) coating on at least one surface of the optical train and disposed to mitigate stray light signatures from being detected at the primary and reference detectors.

18. The gas detection apparatus of claim 16, wherein:
the first reflective surface comprises a first curved reflective surface configured to concentrate the first light stream at the primary detector, and,
the second reflective surface comprises a second curved reflective surface configured to concentrate the second light stream at the reference detector.

* * * * *